H. S. McCORMICK AND A. GLAUBER.
COMBINED INFLATING VALVE AND GAUGE.
APPLICATION FILED JAN. 27, 1920.
1,403,797.
Patented Jan. 17, 1922.
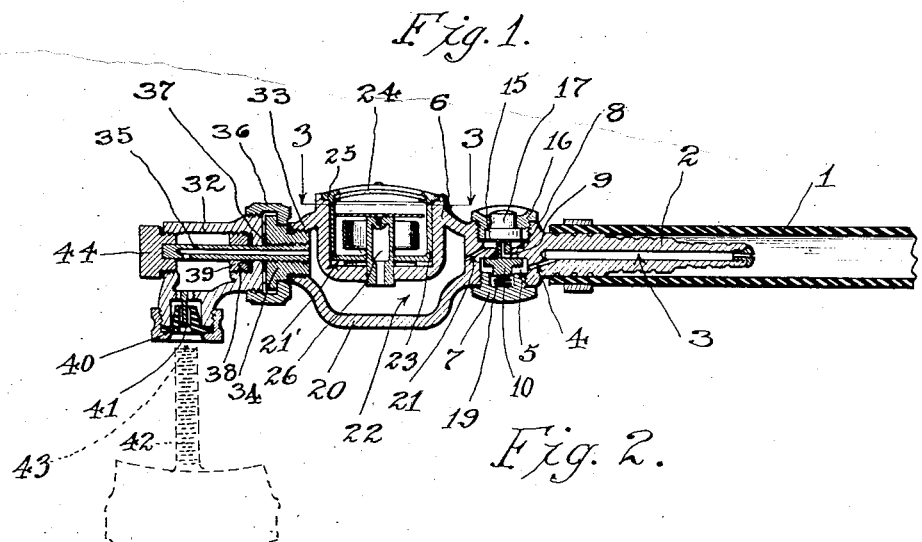
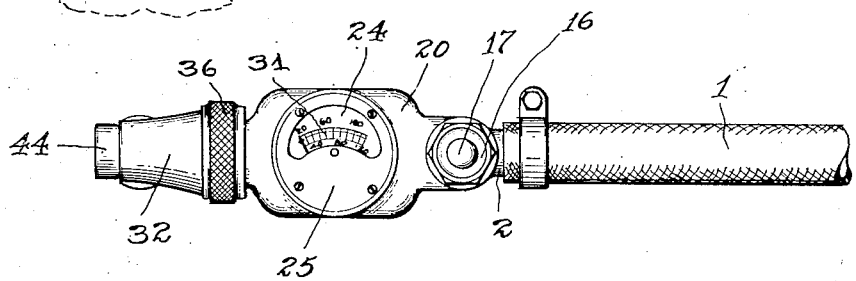
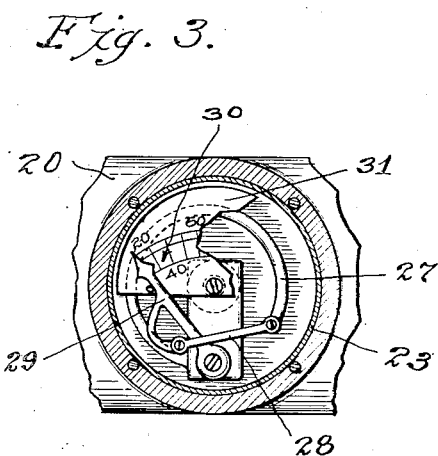
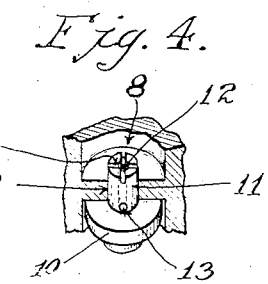
INVENTOR.
H S McCormick
August Glauber
BY
Acker & Totten
ATTORNEYS.

UNITED STATES PATENT OFFICE.

HERBERT S. McCORMICK, OF ALAMEDA, AND AUGUST GLAUBER, OF OAKLAND, CALIFORNIA.

COMBINED INFLATING VALVE AND GAUGE.

1,403,797.  Specification of Letters Patent.  Patented Jan. 17, 1922.

Application filed January 27, 1920. Serial No. 354,503.

*To all whom it may concern:*

Be it known that we, HERBERT S. McCORMICK and AUGUST GLAUBER, citizens of the United States, said McCORMICK a resident of Alameda, in the county of Alameda and State of California, and said GLAUBER a resident of Oakland, county of Alameda, State of California, have invented certain new and useful Improvements in Combined Inflating Valves and Gauges, of which the following is a specification.

The present invention relates to a combined gauge and inflating valve by the employment of which one who is inflating a tire may readily observe at all times, while the tire is being inflated, the air pressure contained therein, and when the same reaches the required amount, the device may be removed, and not requiring the interchanging or attachment and detachment of the inflating valve and pressure gauge in successive operations.

The principal objects of the invention are to provide an apparatus which may be attached to the end of the inflation hose, and whereby the inflating valve is capable of axial movement relative to the hose so that said valve may be positioned over the tire valve stem without kinking or twisting the hose, and at the same time maintain the gauge graduations disposed to view by the operator. To provide a construction wherein there is contained a simple and novel form of controlling valve; one wherein a gauge is employed which is open to the pressure contained within the tire, and one wherein there is provided a novel form of swivel connection between the main or body portion of the apparatus and the inflating valve.

With the above mentioned and other objects in view the invention consists in the novel construction and combination of parts hereinafter described illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

In the drawings Fig. 1 is a longitudinal sectional view of the preferred embodiment of our invention, and illustrating in dotted lines, a valve stem in cooperative engagement with the inflating valve.

Fig. 2 is a view in top plan.

Fig. 3 is a broken sectional view of the pressure gauge taken on line 3—3 of Fig. 1.

Fig. 4 is a view in detail perspective of the valve within the apparatus.

Referring to the drawings wherein like characters of reference designate corresponding parts, 1, indicates a suitable hose connected with an air pressure apparatus of any suitable or well-known type. Into the free end of the hose is adapted to be inserted the serrated tubular nipple 2, formed with a longitudinal bore 3, from the inner end of which extends a smaller bore 4 communicating with a valve chamber 5, formed in the body 6 of the apparatus. The valve chamber is open at one end, and which open end is adapted to be closed by a threaded plug 7, and said chamber communicates with an adjacent chamber 8 through a bore 9, all of which is illustrated in Fig. 1 of the drawings. Mounted within the chambers 5 and 8 and bore 9 is a suitable valve consisting of a circular disk 10 of a diameter to rest on the upper wall of the chamber 5, and carrying a stem 11, which extends through the bore 9, and upwardly into the chamber 8, said stem in its center being provided with the vertical channel 12, having at its lower end a lateral opening 13, at a point immediately above the upper surface of the disk 10, and the upper end of said channel 12, being cross-cut, as at 14, Fig. 4 of the drawings. Within the chamber 8, and resting on the upper cross-cut end of the stem 11, is positioned a flexible disk 15, held in position by a collar 16, threaded into the upper end of the chamber 8, and on said disk is adapted to rest the inner end of a push-button 17, for operating the valve disk 10. A spring 19 is positioned between the closure member 7 and the underface of the disk 10 to normally maintain the disk seated against the under-surface of the top wall of the chamber 5, and to cut off communication between the chambers 5 and 8. A downward pressure on the button 17 will force said valve downwardly and expose the lateral end 13 to the interior of the chamber 5, permitting air to pass from the chamber 5 through the channel 12 and into the chamber 8.

The body 6 is provided with an enlarged portion 20 into which leads a bore 21 from the chamber 8, and the upper wall of said enlarged portion 20 is preferably provided with a circular depression 21' adapted to receive any suitable form of air gauge operated by pressure passing from the bore 21 into the chamber 22 in the enlarged portion. The form of air gauge illustrated, comprises a shell 23, adapted to be closed by a suitable transparent member 24, held in position by a retaining plate 25, and within said shell is mounted a hollow stud or member 26 connecting at one end with the chamber 22 and at its opposite end with a suitable flexible hollow tube 27 to the free end of which is connected by the link 28 an indicator or pointer 29, operating over graduations 30 on a dial 31, which is visible through the transparent member 24.

To the outer end of the enlarged portion 20 is secured the inflating valve 32, of any well-known construction, and in order to enable said valve to be rotated axially of the hose 1, in order to maintain the hose free from kinks and to permit the gauge to be within the view of the operator, I prefer to attach said inflating valve in the following manner:

Threaded in a bore 33 in the outer end of the chamber 22, is a suitable flanged plug 34, outwardly from which, preferably at right angles to its outer face, extends the tubular member 35. The casing of the inflating valve 32 which is of the elbow type and hollow, is positioned over said member 35 and is rotatable about the same, said casing being secured through the threaded shell 36 carried by the flange plug 34 to the outer face of said flange plug; and interposed between the adjacent surfaces formed by said connection is a metallic washer 37. To prevent leakage of the air around the member 35 a packing or gland 38 is employed, held in position by the nut 39. The free end of the casing 32 mounts the usual form of elastic valve stem gripping member 40, and carries the unseating pin 41, which when the casing 32 is positioned over the valve stem 42, is adapted to contact with the valve 43 within the valve stem and unseat the same. The plug 44 threaded into the casing 32, provides a bearing for the outer end of the member 35.

Having thus described our invention what we claim as new is:

1. An apparatus for inflating tires, comprising a body having a passage therethrough, a gauge positioned wholly within the body, a valve engaging head connected to the body, and means for controlling the passage of air through the body.

2. An apparatus for inflating tires, comprising a body having a passage therethrough and a depression, a gauge housed in the depression within the outline of the body, a valve engaging head connected to the body, and means for controlling the passage of air through the body.

In testimony whereof we have signed our names to this specification.

HERBERT S. McCORMICK.
AUGUST GLAUBER.